Nov. 3, 1953 R. A. HARTMAN 2,657,443
FASTENING DEVICE
Original Filed Dec. 4, 1946
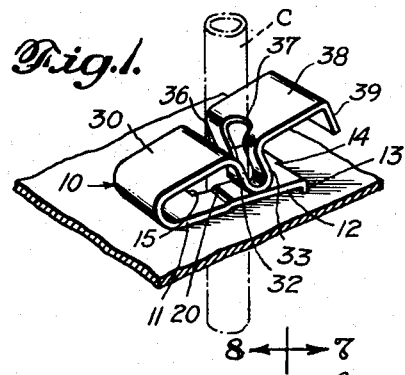
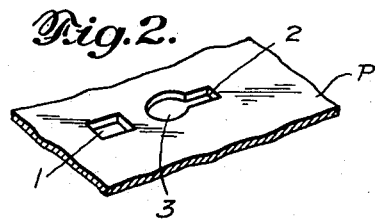
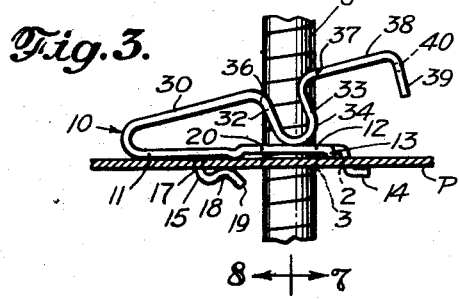
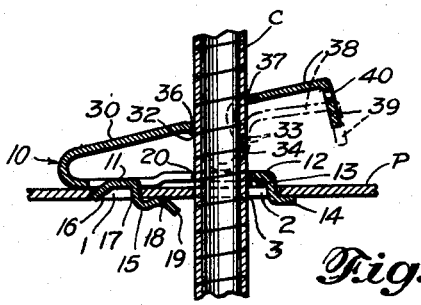
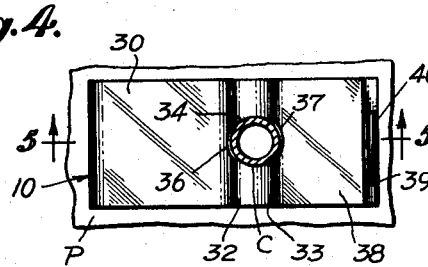
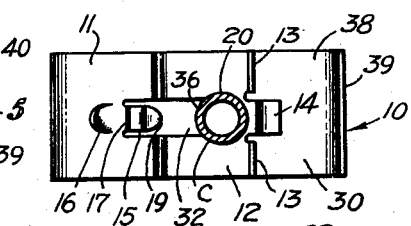
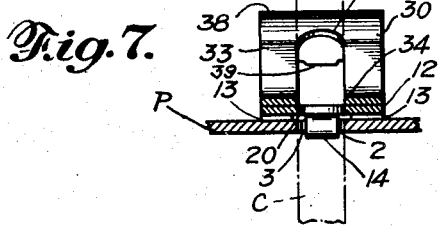
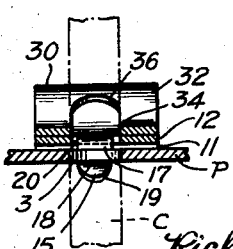
Inventor
Richard A. Hartman
By H. G. Lombard
Attorney

Patented Nov. 3, 1953

2,657,443

UNITED STATES PATENT OFFICE 2,657,443

FASTENING DEVICE

Richard A. Hartman, Cleveland, Ohio, assignor to Tinnerman Products, Inc., Cleveland, Ohio, a corporation of Ohio Original application December 4, 1946, Serial No. 714,120, now Patent No. 2,566,886, dated September 4, 1951. Divided and this application August 8, 1951, Serial No. 240,903

3 Claims. (Cl. 24—201)

1

This invention relates, in general, to improvements in the securing or mounting of an object in axially adjustable relation to a support. The invention pertains, more particularly, to an improved securing device and the installation thereof in an assembly for anchoring a shaft, rod, tube, cable or similar object in generally normal or other angular relationship to a panel or equivalent support, and capable of ready adjustment axially in either direction relative to the support without disturbing the installation of the securing device or the assembly thereof with the object supported.

This application is directed, more particularly, to the attaching means of the invention as employed in the present fasteners and in similar and related fastening devices in general; the instant application is a division of application Serial Number 714,120, filed December 4, 1946, and issued as U. S. Patent Number 2,566,886 on September 4, 1951.

A primary object of the invention is to provide an improved anchoring device of this character in the form of a highly simplified spring fastener designed for ready attachment to a panel or other support and comprising resilient clutch means adapted to receive an object and firmly and rigidly retain the same relative to the support but capable of axial adjustment in either direction as necessary to meet the demands or requirements of the installation.

Another object of the invention is to provide such a fastener in the form of a unitary clip device which comprises resilient gripping means for securing or mounting an object in generally normal relation to a panel or other support, and attaching means designed for a quick and easy application of the fastener to complete an installation without the use of bolts, nuts, screws, or other extraneous fastening means.

A further object of the invention is to provide an improved mounting clip device of the kind described which is strong, durable and reliable and is adapted for economical quantity production at comparatively low cost in that it may be manufactured from standard sheet metal strip stock with little loss or waste of material.

Further objects and advantages of the invention will be readily apparent as the following description proceeds with reference to the accompanying drawings, for purposes of illustration but not of limitation, in which like reference characters designate like parts throughout the same, and in which:

Fig. 1 is a perspective view of an installation embodying the improved fastener of the invention, the object mounted, such as a tube or the like, being represented in broken lines;

Fig. 2 is a perspective view of the hole layout in a panel or plate as prepared for the assembly shown in Fig. 1;

Fig. 3 is a side view of the assembly shown in Fig. 1, with the fastener and the object shown in elevation and the supporting panel illustrated in section;

Fig. 4 is a top plan view of Fig. 3;

Fig. 5 is a sectional view of Fig. 4 along line 5—5, looking in the direction of the arrows;

Fig. 6 is a bottom plan view of the fastener per se showing the position of a tube or other object in assembled relation therewith;

Fig. 7 is a sectional view of Fig. 3 taken on line 7—7 and looking in the direction of the arrows pointing to the right; and, Fig. 8 is a sectional view of Fig. 3 taken on line 8—8 and looking in the direction of the arrows pointing to the left.

Referring now, more particularly, to the drawings, the invention is disclosed in connection with a mounting for a flexible shaft, tube or other conduit of the type used, for example, to provide a sheathing for a flexible control shaft extending through a panel or plate to the control head of an automobile radio apparatus. Such an installation is typical of the type wherein provision must be made for ready axial adjustment of the shaft or cable relative to the panel in order to satisfy the requirements of various similar assemblies in accordance with the size of the parts and the location thereof in the installation. It is to be understood, however, that the invention is not in any way limited to the type of installation described inasmuch as the improved fastener is one of general utility which is capable of a wide range and variety of applications and uses in installations in which it is necessary or desirable to mount a rigid or flexible shaft, rod, tube, cable or other conduit in axially adjustable relation to a panel, plate or similar support.

In the present illustration, the object to be mounted is represented as a flexible tube or conduit C serving as a casing or sheathing for a flexible control shaft which extends therethrough. The conduit C extends axially through an opening in a panel or plate-like support P, and, by means of the improved fastener of the invention, is anchored to the panel in any desired position along its length, but capable of axial adjustment as may be necessary or desirable. As best seen in Fig. 2, the area of the panel P through which it is desired that the conduit C extend in mounted position, is provided with a simple hole layout comprising spaced openings in the form of slots 1, 2. Adjacent the slot 2, and preferably merging therewith, as shown, is a circular panel opening or passage 3 adapted to receive the conduit C or other object to be mounted.

The fastener designated generally 10 is a relatively simple, inexpensive article of manufacture in that it may be produced at relatively low cost from ordinary sheet metal strip stock with little loss or waste of material. Any suitable sheet metal may be employed, preferably spring steel or cold rolled steel having spring characteristics. The strip of sheet metal is bent intermediately to define a base 11 and an overlying resilient head member or spring arm 30 extending in the same general direction in generally V-shaped relation thereto. The base 11 includes an inwardly offset portion 12 having outwardly bent feet 13 on either side of a hook 14 projecting outwardly out of the general plane of said base.

From within the periphery of said plate-like base 11 of the clip, attaching means are provided which are designed for substantial snap fastening action in the assembling slot or opening 1 in the panel and which adapt the clip to be applied to attached position by an operation taking place entirely from one side of said panel member P. Thus, in an installation comprising a relatively large panel, only one operator is needed to apply the fastener and otherwise complete the installation, whereas, if nuts and bolts were employed as attaching means another worker would be required at the rearward side of the panel to hold the nuts as the cooperating bolts were inserted and fastened therewith.

A preferred form of such snap fastening attaching means is provided in the manner of cooperating attaching finger and locking detent elements 15, 16, respectively, Fig. 5, both of which are depressed from the base 11 of the clip device to extend from the undersurface thereof. The attaching finger 15 preferably is formed into a substantial hook defining a shoulder 17 immediately adjacent the base while a free end portion thereof is bent outwardly to provide a flared lip 19 inclined toward a work engaging or bearing portion 18 of said finger. Said hook 15 extends in generally parallel relation to the base 11 with the bearing portion 18 thereof spaced from the base a distance slightly less than the thickness of the panel member in order to grip the same firmly, and with the lip 19 flared outwardly therefrom to a spacing considerably greater than the thickness of said panel member to facilitate the initial application of the attaching finger to the panel edge adjacent said assembling opening 1. Adjacent the hole in the offset portion 12 of the base from which the hook 15 is struck and formed, an enlarged opening 20 is provided for passing the conduit C therethrough in generally normal or other angular relationship to the fastener base.

The locking detent 16, Fig. 5, may be of any suitable character and is preferably provided by a small projection which is pressed out of the plane of the base 11 such that the projecting end thereof defines a relatively sharp shoulder adapted to abut the side wall of the assembling opening 1 in positive locking relation therewith. Said detent otherwise is so designed that the engaging portion thereof is spaced from the shoulder 17 of the attaching hook 15 a distance at least slightly less than the spacing of opposing wall portions of the assembling opening 1 to engage an adjacent wall thereof in opposition to removal or displacement of said finger from fully attached position in said opening.

The spaced hooks 14 and 15, accordingly, are designed to cooperate with each other to hold the fastener immovably in attached position on the panel as shown in Figs. 3 and 5. The assembling openings or slots 1, 2, are designed with a spacing corresponding substantially with the spacing of said hooks so as to receive the same readily, whereupon the fastener is moved laterally to position said hooks in offset relation to said openings and in engagement with the underside of the panel adjacent said openings.

Thus, the hooks 14, 15 cooperate with the base 11 of the fastener in engaging opposite sides of the panel P to hold the fastener fixedly at attached position thereon. In fully applied position, as shown in Fig. 5, the opening 20 in the fastener base is aligned with the conduit passage 3 in the panel, and the fastener otherwise is locked in such applied position by the detent 16 which snaps into slot 1 and engages the side wall of said slot opposite to that engaged by the shoulder 17 of the hook 15. The detent 16 thus prevents any reverse movement or displacement of the fastener base in the direction of removal of the hook 15 from the opening 1 or the hook 14 from the opening 2 such that the fastener is positively locked in attached position on the panel.

The resilient spring arm or head member 30 of the fastener extends in spaced, generally V-shaped or parallel relation to the fastener base 11 and intermediate its length is folded into an open substantial U-shape which extends downwardly into engagement with the offset portion 12 of the fastener base and provides a pair of spaced spring gripping jaws 32, 33. A lengthwise slot in said U-shaped portion forming the jaws 32, 33 defines an elongated passage 34, Fig. 4, for receiving the conduit C, and provides a relatively sharp clutch or gripping edge 36 on jaw 32 and a similar cooperating clutch 37 on jaw 33. Said jaw clutches 36, 37, have in normal untensioned relation a spacing less than the cross-section of the conduit C, and when spread apart are adapted to receive the conduit and firmly and rigidly grip the same to mount the conduit in a completed installation. The passage 34, Fig. 4, between said spaced jaws 32, 33 is suitably aligned with the passage 20 in the fastener base, and the adjacent end of the spring arm 30 otherwise includes a projecting flange 38 by which pressure is exerted on the spring arm to compress the same toward the fastener base 11. A tab 39, formed on the extremity of said flange serves as a means which may be grasped by a pair of pliers or other tool to facilitate the application of the fastener, and, for a similar purpose, a slot 40 in said tab is adapted to receive a pointed tool, such as a screw driver or drift pin, for working the fastener into attached position on the panel P.

With the fastener 10 provided substantially as described, it will be understood that it is readily assembled to attached relation on the panel P by inserting the hooks 14, 15, Fig. 5, into the correspondingly spaced assembling openings or slots 2, 1, respectively, to seat the fastener base on the panel P, and then advancing the fastener laterally until the shoulders defined by said hooks engage the adjacent walls of said slots as seen in Fig. 5. In this relation the hooks 14, 15, are offset relative to the slots 2, 1, respectively, and engage the undersurface of the panel adjacent to said slots and thereby cooperate with the fastener body in engaging opposite sides of the panel to secure the fastener firmly and rigidly to the panel at spaced points. The detent 16 snaps into engagement with the wall of slot 1 in opposed relation to hook 15 and thereby locks the fastener in fully applied position in which both the passage 20 in the fastener base and the passage 34 in the spring arm 30 are aligned with and in registration with the conduit passage or opening 3 in the panel P.

With the fastener thus locked in attached position on the panel, the shaft, cable, conduit or other object C is readily passed through the aligned passages 3, 20 and 34 and between the jaw clutches 36, 37, when pressure is exerted on the flange 38 to move the same toward the fastener base, as represented in broken lines in Fig. 5, whereupon the spring jaws 32, 33 spread apart and thereby spread the clutch elements 36, 37 as necessary to pass the conduit therebetween. The spreading action of the clutch elements 36, 37 is facilitated by the bearing engagement of the bight of the U-shaped jaws 32, 33 on the offset base portion 12. Upon release of pressure on the flange 38, the jaw clutches 36, 37, spring toward each other in attempting to assume their initial normally untensioned relation, and thereby tenaciously grip the conduit to hold the same firmly and rigidly in mounted position on the panel. A similar mounting may be obtained in a reverse application of the conduit C by first passing the same through the spread apart jaw clutches 36, 37, and then through the passage 34 between the jaws 32, 33 which is aligned with the passage 20 in the fastener base and the opening 3 in the panel. In either case, the clutch jaws 36, 37 are adapted to exert a lateral thrust on the conduit which causes a binding action thereof on the edge of the passage 20 in the fastener base and the panel opening 3 to provide for increased strength and rigidity in the mounting. In addition, the edges of the jaws 32, 33 adjacent the passage 34 therein, engage the conduit to hold the same against lateral shifting or tilting in a manner whereby the conduit C is anchored fixedly in desired normal or other angular relationship to the panel as well as secured against axial movement in either direction relative to the panel from its applied mounted position. While the conduit is thus anchored to the panel in any such mounted position, it may be readily adjusted axially in either direction simply by compressing the flange 38 as necessary to permit the conduit to slide between the jaw clutches 36, 37, to the desired position of adjustment with respect to the panel P or other support.

The clip fastener in any form preferably is constructed of relatively thin sheet metal, the thickness of which is selected according to service requirements and the predetermined size of the parts secured. The fasteners are most effective when provided of spring metal suitably spring tempered and otherwise treated to give the desired toughness and hardness, particularly in the case of devices which are put to heavy duty in installations where extreme vibratory motion takes place. A cheap but effective fastener may be provided from cold rolled metal, such as cold rolled steel, which is untempered but of a spring metal nature and capable of providing an effective and reliable fastening means adapted for a long period of satisfactory service and use.

While the invention has been described in detail with a specific example, such example is intended as an illustration only, since it will be apparent to those skilled in the art that other modifications in the construction, arrangement and general combination of parts may be devised without departing from the spirit and scope of the invention. The present embodiment is therefore to be considered in all respects as illustrative and not restrictive, the scope of the invention being indicated by the appended claims rather than by the foregoing description, with all changes falling within the scope, meaning and range of equivalency of the claims intended to be embraced therein.

What is claimed is:

1. A fastener for attachment to a support to secure an object extending through a passage in said support, said support having a pair of spaced attaching holes on opposite sides of said passage therein, said fastener comprising a sheet metal body having a base adapted to bear on said support and provided with an opening adapted to register with said passage in the support, a pair of spaced hooks projecting from the underside of said fastener base on opposite sides of said opening therein, said hooks extending in the same general direction and having a spacing corresponding to that of said spaced attaching holes for entering said attaching holes in the attached position of the fastener, said base in the area of the opening therein being provided with an upwardly offset base portion adapted for spaced relation to said support in said attached position of the fastener, and means integrally formed on said upwardly offset base portion and projecting from the underside of said upwardly offset base portion and engageable with the support to bolster said upwardly offset base portion in said spaced relation to the support.

2. A fastener for attachment to a support to secure an object extending through a passage in said support, said support having a pair of spaced attaching holes on opposite sides of said passage therein, said fastener comprising a sheet metal body having a base adapted to bear on said support and provided with an opening adapted to register with said passage in the support, a pair of spaced hooks projecting from the underside of said fastener base on opposite sides of said opening therein, said hooks extending in the same general direction and having a spacing corresponding to that of said spaced attaching holes for entering said attaching holes in the attached position of the fastener, a detent also projecting from the underside of said fastener base adjacent one of said hooks and engageable with said support to retain said hooks in said attaching holes in said attached position of the fastener, said base in the area of the opening therein being provided with an upwardly offset base portion adapted for spaced relation to said support in said attached position of the fastener, and means intergrally formed on said upwardly offset base portion and projecting from the underside of said upwardly offset base portion and engageable with the support to bolster said upwardly offset base portion in said spaced relation to the support, said means comprising a pair of spaced elements depending from opposite sides of said upwardly offset base portion.

3. A fastener for attachment to a support to secure an object extending through a passage in said support, said support having a pair of spaced attaching holes on opposite sides of said passage therein, said fastener comprising a sheet metal strip having a base adapted to bear on said support and provided with an opening adapted to register with said passage in the support, a pair of spaced hooks projecting from the underside of said fastener base on opposite sides of said opening therein and comprising a forward hook and a rearward hook, said hooks extending in the same general direction lengthwise of said strip and having a spacing corresponding to that of said spaced attaching holes for entering said attaching holes in the attached position of the fastener, a detent also projecting from the underside of said fastener base adjacent said rearward hook and receivable in the same hole in said support to retain said hooks in said attaching holes in said attached position of the fastener, said base in the area of the opening therein being provided with an upwardly offset base portion adapted for spaced relation to said support in said attached position of the fastener, and means integrally formed on said upwardly offset base portion and projecting from the underside of said upwardly offset base portion and engageable with the support to bolster said upwardly offset base portion in said spaced relation to the support, said means comprising a pair of spaced feet depending from said upwardly offset base portion at opposite sides of said forward hook.

RICHARD A. HARTMAN.

References Cited in the file of this patent
UNITED STATES PATENTS

| Number | Name | Date |
|---|---|---|
| 2,222,449 | Tinnerman | Nov. 19, 1940 |
| 2,238,664 | Tinnerman | Apr. 15, 1941 |
| 2,250,072 | Tinnerman | July 22, 1941 |